(12) United States Patent
Sadhu et al.

(10) Patent No.: US 11,543,523 B2
(45) Date of Patent: Jan. 3, 2023

(54) MULTI FREQUENCY LONG RANGE DISTANCE DETECTION FOR AMPLITUDE MODULATED CONTINUOUS WAVE TIME OF FLIGHT CAMERAS

(71) Applicant: TEXAS INSTRUMENTS INCORPORATED, Dallas, TX (US)

(72) Inventors: Venkata Subhash Chandra Sadhu, Bengaluru (IN); Bharath Patil, Bengaluru (IN); Nithin Jose, Bengaluru (IN); Shubham Agrawal, Damoh (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1041 days.

(21) Appl. No.: 16/235,667

(22) Filed: Dec. 28, 2018

(65) Prior Publication Data

US 2020/0209392 A1 Jul. 2, 2020

(51) Int. Cl.
*G01S 17/10* (2020.01)
*G01S 17/89* (2020.01)
*G06T 7/521* (2017.01)
*G01S 17/08* (2006.01)

(52) U.S. Cl.
CPC ............ *G01S 17/10* (2013.01); *G01S 17/08* (2013.01); *G01S 17/89* (2013.01); *G06T 7/521* (2017.01); *G06T 2207/10028* (2013.01); *G06T 2207/10144* (2013.01); *G06T 2207/10152* (2013.01)

(58) Field of Classification Search
CPC .......... G01S 17/10; G01S 17/08; G01S 17/89; G06T 7/521; G06T 2207/10028; G06T 2207/10144; G06T 2207/10152
See application file for complete search history.

(56) References Cited

U.S. PATENT DOCUMENTS

| 2011/0301914 | A1* | 12/2011 | Maltseff | G01S 17/36 |
| | | | | 702/159 |
| 2016/0377722 | A1* | 12/2016 | Lardin | G01S 17/42 |
| | | | | 356/5.12 |
| 2017/0038192 | A1* | 2/2017 | Chen | G01B 9/02028 |
| 2018/0259647 | A1* | 9/2018 | Takano | G01S 7/487 |
| 2019/0204419 | A1* | 7/2019 | Baba | G02F 1/29 |
| 2019/0204447 | A1* | 7/2019 | Lardin | G01S 17/34 |

FOREIGN PATENT DOCUMENTS

| CN | 1831560 | * | 4/2006 |
| CN | 109253661 | * | 1/2013 |

* cited by examiner

*Primary Examiner* — Zaihan Jiang
(74) *Attorney, Agent, or Firm* — John R. Pessetto; Frank D. Cimino

(57) ABSTRACT

A time of flight (ToF) system includes a light source, a photosensor, a signal generator and a processor. The signal generator outputs a reference signal corresponding to a modulation function for modulated light and a modified transmitted light signal corresponding to a phase shift of the reference signal. The light source outputs the modified transmitted light signal and pixels in the photosensor receives its reflections off the scene. The reference signal is applied to the pixels and the processor determines a depth map for the scene based on values recorded by the pixels. In some examples, the phase shift is implemented using a phase locked loop controller. One or more component phases of the phase shift and an exposure time for each component phase are determined and output by the phase locked loop controller.

24 Claims, 9 Drawing Sheets

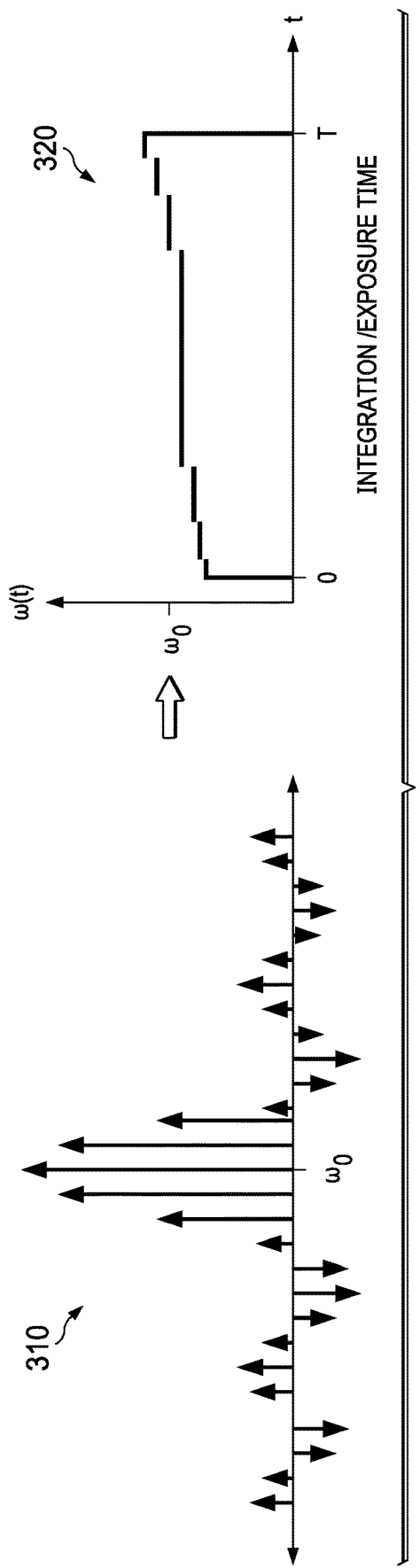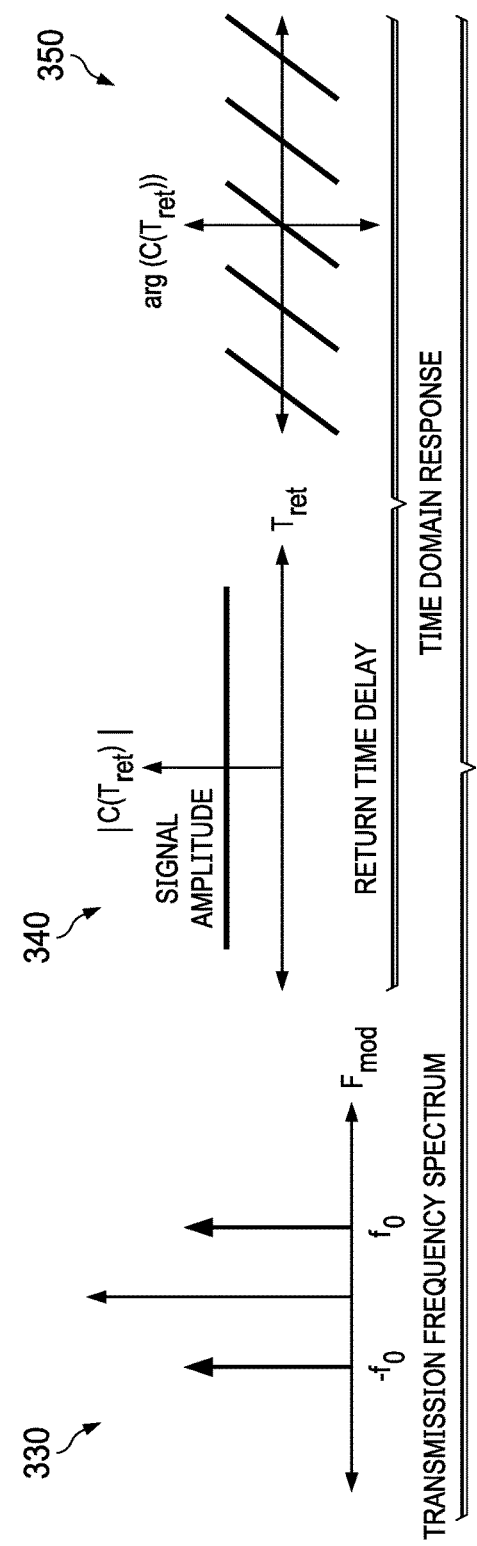
FIG. 3A
FIG. 3B

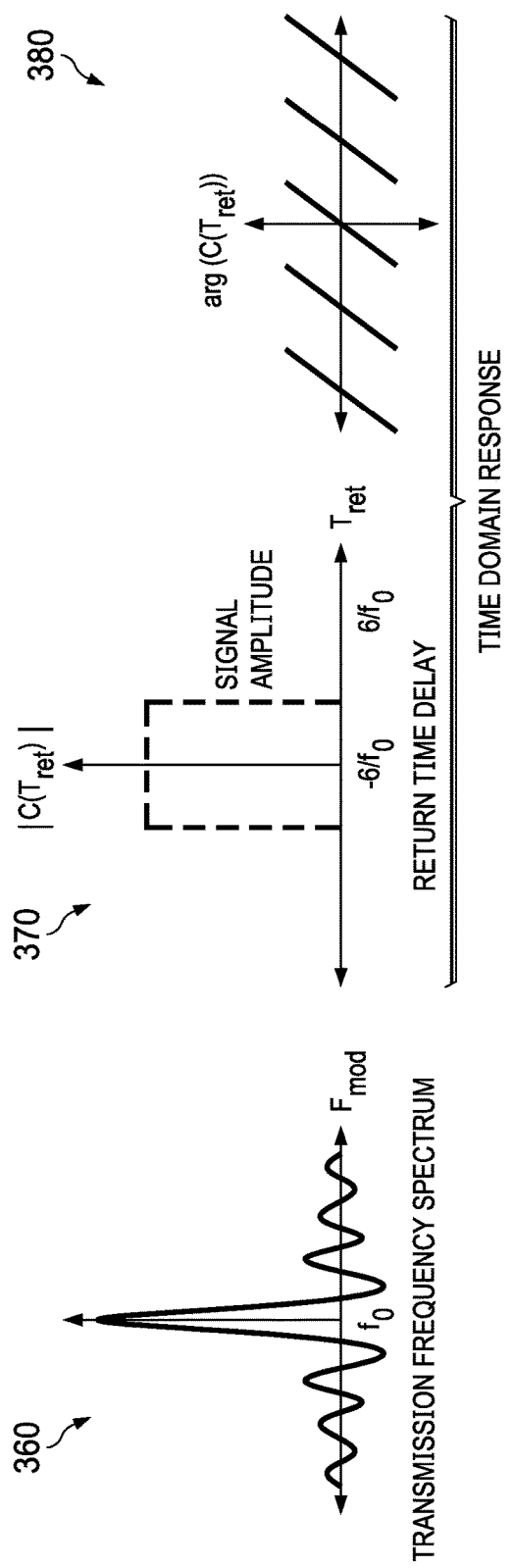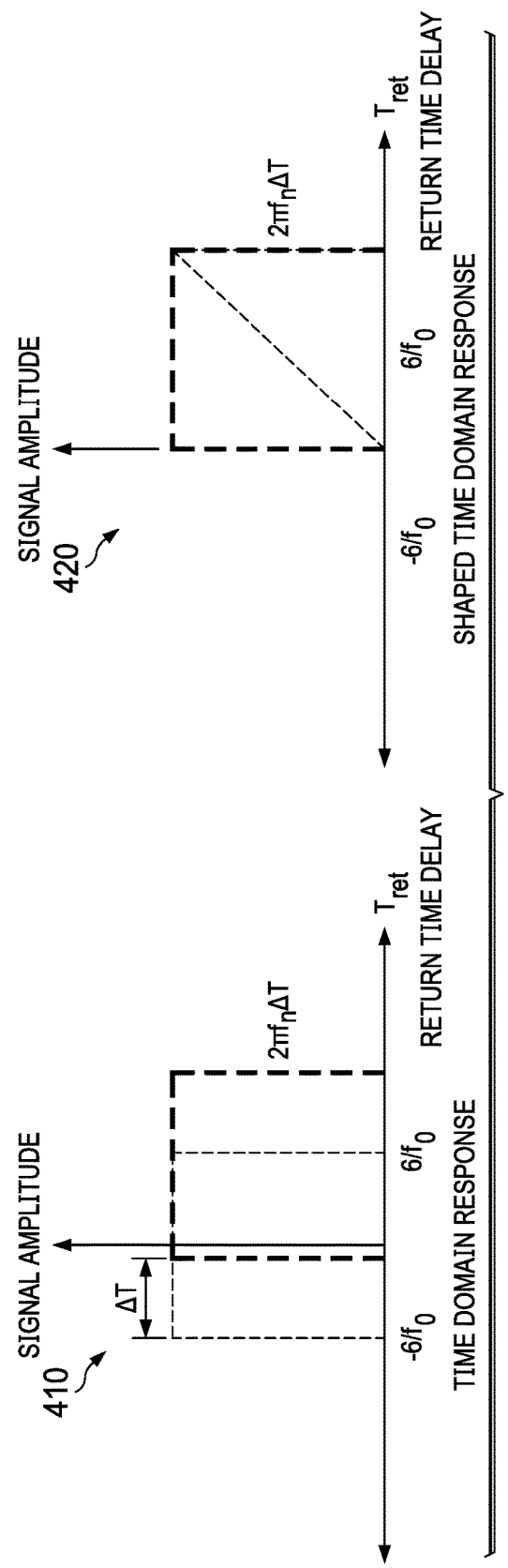
FIG. 3C
FIG. 4

MULTI FREQUENCY LONG RANGE DISTANCE DETECTION FOR AMPLITUDE MODULATED CONTINUOUS WAVE TIME OF FLIGHT CAMERAS

BACKGROUND

Time of flight (ToF) cameras provide a depth map of a scene. In particular, a ToF camera is a range imaging camera system that resolves distance based on the known speed of light, by measuring the time of flight of a light signal between the camera and the subject for each point of the image. A ToF camera generally includes an illumination unit that illuminates the subject with light modulated with frequencies up to, for example, 100 Megahertz (MHz). The illumination unit may use infrared light to make the illumination unobtrusive or the ToF camera more resilient to ambient light. Infrared light also allows the ToF camera to use high peak illumination without affecting human eyes, improving the signal to noise ratio of the system.

At the image sensor, each pixel measures the time the light has taken to travel from the illumination unit to the object and back to the sensor using a phase difference between the received reflections of the transmitted light and a reference signal. From this time, a distance between the subject at that point and the ToF camera system can be determined. Some ToF systems are limited in the range that they are able to unambiguously determine the distance between an object and the ToF system because the phase difference between the reflections and the reference signal increase as distance increases until the distance is large enough (equal to the wavelength of the modulation frequency) for the phase difference to wrap-around at 360 degrees back to 0 degrees. The operating range of ToF systems can be extended by reducing the modulation frequency which extends the wavelength, but at the cost of reducing system sensitivity. Some ToF systems incorporate two modulation frequencies and compare the determined phases to find the distance to an object and extend the operating range of the ToF system. However, these systems are susceptible to noise.

SUMMARY

The disclosed examples include a time of flight system including a photosensor having pixels configured to register light reflected by a scene from transmitted modulated light, a signal generator configured to output a reference signal corresponding to a modulation function for the modulated light and a modified transmitted light signal corresponding to a phase shift of the reference signal and a processor. The processor is configured to cause the signal generator to output the modified transmitted light signal and cause the pixels in the photosensor to register light for an exposure period. Then, the processor causes the signal generator to output the reference signal to the pixels in the photosensor and determine a depth map for the scene based on values recorded by the pixels in the photosensor. In some examples, the reference signal includes a plurality of discrete modulation frequencies separated by a frequency difference. In some examples, the phase shift is $2\pi f_n \Delta T$, wherein $f_n$ represents a frequency of a frequency component of the reference signal and $\Delta T$ represents a time delay between a first time period at which light was registered by the pixels and a second time period at which light was registered by the pixels. The ToF system can include a phase locked loop controller to determine component phases of the phase shift and a length of time for each component phase and indicate to the signal generator the component phases and corresponding lengths of time. In some examples, the phase shift is used to customize the correlation between the received reflections and the reference signal.

BRIEF DESCRIPTION OF THE DRAWINGS

For a detailed description of various examples, reference will now be made to the accompanying drawings in which:

FIGS. 3A-C illustrate a set of graphs showing different possible transmission frequency spectrums for an amplitude modulated continuous wave light signal to be emitted by a time of flight camera and used as a reference signal, and the corresponding time domain response and phase of the correlation between reflections of the emitted light and the reference signal.

FIG. 4 illustrates a set of graphs showing different time domain responses and phases of a correlation between reflections of light emitted by a time of flight camera and a reference signal.

DETAILED DESCRIPTION

Figure 1:
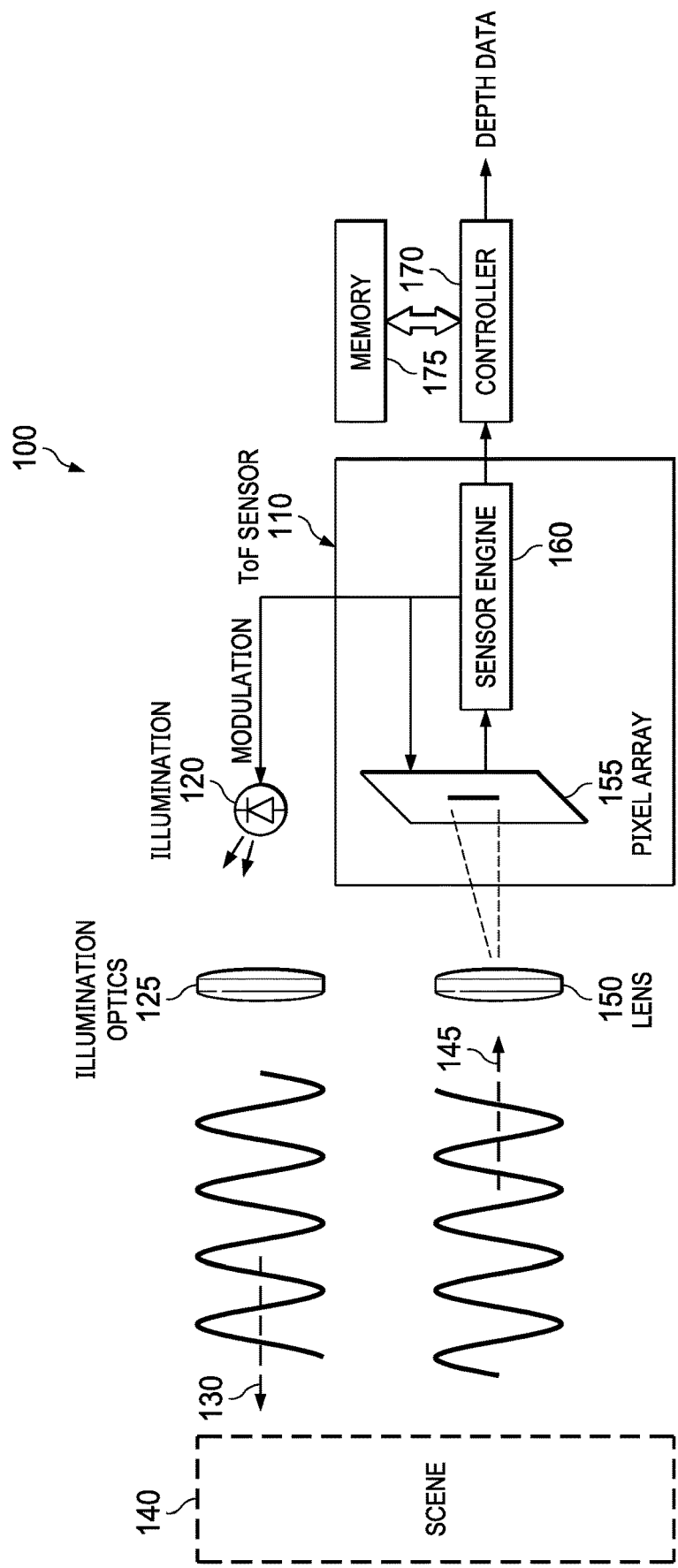
FIG. 1 illustrates an example system for measuring distance using a time of flight camera.

As noted above, some methods of extending the operating range of a time of flight (ToF) camera reduce the system's sensitivity or are susceptible to noise. The disclosed example ToF cameras use a linear combination of a relatively large number of frequencies to extend the operating range without sacrificing system sensitivity and without increasing susceptibility to noise. To avoid the time and power costs associated with transmitting a large number of frequencies, the disclosed examples vary the exposure time for each frequency component to reduce the total power required to output each frequency component. The disclosed examples also vary the phase difference between a reference signal to be correlated with the received reflections of the transmitted signal and the transmitted signal itself by varying the phase of the transmitted signal over time. The controlled phase difference between the reference signal and the transmitted signal enables customization of the correlation between the reference signal and the received reflections of the transmitted signal, including time shifts and changing shapes. To implement a wide variety of phase shifts for a multitude of frequency components, the exposure time for each frequency component is divided and the frequency component is transmitted with a first phase for a first portion of the exposure time and a second, different phase for a second portion of the exposure time.

The use of a large number of linearly combined frequency components and complex frequency components enables extension of the ToF system's operating range. Time shifting the correlation of the received reflections of the transmitted signal and the reference signal increases the return times the ToF system receives reflections at, corresponding to longer distances. Shaping the correlation by changing the spectral content of the transmitted signal improves the signal to noise ratio of the ToF system at longer distances. The disclosed ToF systems search long distances for objects using several processes. One process includes a binary search over the large range of distances by changing the shape and time delay of the correlation. Another process includes separating the frequency components into sets based on the phase offset for a time delay and exposing each set of frequency components separately. The correlation for each set and corresponding exposure can be time-delayed such that the full range of distances is searched linearly, using a unique correlation for each exposure to search a difference set of distances within the full range of distances. Another process includes incorporating a lower frequency into the modulation frequency of either the reference signal or the transmitted signal to generate a superimposed "metasignal" with a triangular wave shape and a period of 2t. A series of frames collect information about the scene using the higher modulation frequencies and a series of "superframes" collect information about the scene using the lower modulation frequency. The frames and superframes can be used to obtain information regarding long distances.

FIG. 1 illustrates a block diagram of an example 3D ToF camera system 100 including ToF sensor 110 and controller 170. Either or both of sensor 110 and controller 170 can include one or more integrated circuits (ICs), or the like, separately or together. ToF camera system 100 includes at least one illumination module, which includes an illumination driver such as the one provided via sensor engine 160 and illumination source 120. Illumination source 120 is configured to project a modulated light signal 130 onto scene 140. Some ToF cameras, including ToF camera system 100, include other optics elements such as lenses, illustrated as illumination optics 125 in FIG. 1, to assist in projection of modulated light signal 130 onto scene 140.

Sensor engine 160 receives reflections of modulated light signal 130 off scene 140, represented as received light signal 145, at a pixel array 155. Some ToF cameras, including ToF camera system 100, include other optics elements such as lenses, illustrated as lens 150, to assist in receiving reflections off scene 140. Sensor engine 160 also receives a reference signal, representing a time shifted modulated light signal 135, and correlates received light signal 145 with the reference signal to determine phase measurements of received light signal 145 and/or other signal data. In some examples, the correlation is done by the pixel array 155. This data is provided to controller 170, which determines a distance between ToF camera 100 and scene 140 using the provided data. Controller 170 can be coupled to an external memory 175 and temporarily store at least part of the provided data in the external memory 175. The determined distance can be output as depth data to one or more other devices by controller 170.

Figure 2:
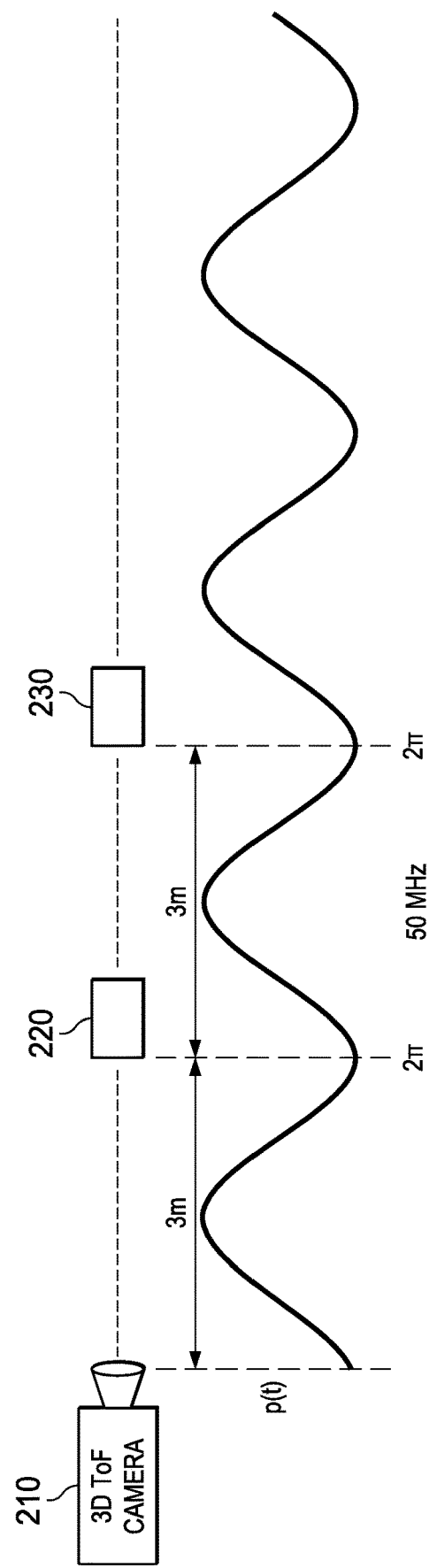
FIG. 2 illustrates the limited range of an example time of flight camera.

The correlation of received light signal 145 with the reference signal is represented as:

$$C(T) = \int_0^T f(t+\Delta t_i) r(t) dt$$

where T represents the time the pixel array 155 receives the reflections of scene 140, r(t) represents the received light signal 145, and f(t+$\Delta t_i$) represents the reference signal, which is a time shifted modulated light signal 135. The phase of the received light signal 145, r(t), "wraps around" at $2\pi$, which leads to distance ambiguity. FIG. 2 illustrates the limited range of an example time of flight camera 210. The unambiguous distance of a ToF camera is represented as:

$$Ud = \frac{c}{2f}$$

where c represents the speed of light and f represents the modulation frequency of light projected by the ToF camera. For example, light projected by ToF camera 210, p(t), is modulated at a frequency of 50 MHz and the unambiguous operating range of ToF camera 210 is limited to 3 meters. Since both object 220 and object 230 are represented by the same phase, $2\pi$, ToF camera 210 will determine that object 220 three meters away from ToF camera 210 and object 230 six meters away from ToF camera 210 are at the same distance. A common technique to extend the range of a ToF camera is to modulate light projected by the ToF camera by two frequencies. This serves as an anti-aliasing time filter implemented in frequency and extends the unambiguous distance of the ToF camera to the least common multiple of those frequencies. However, this technique is still susceptible to noise and unnecessary signal reflection from highly reflective objects at large distances.

FIGS. 3A-C illustrate a set of graphs showing different possible transmission frequency spectrums for an amplitude modulated continuous wave light signal to be emitted by a time of flight camera and used as a reference signal, and the corresponding time domain response and phase of a correlation between reflections of the emitted light correlated and the reference signal. FIG. 3A shows a graph 310 of multiple discrete frequencies centered around a frequency f0 and the signal amplitude for each frequency. By choosing frequencies such that the strength of a signal reflected after a certain distance is very small, the use of multiple discrete frequencies can reduce the impact of long distance object reflection. While as few as two frequencies are sufficient to reduce noise from long distance object reflection, some ToF systems use fifty or more discrete frequencies. The signal from each frequency component is scaled by a complex value and the signals are linearly combined. To avoid the time and readout power cost of transmitting such a large number of frequencies, each frequency's exposure time is weighed to accommodate a signal amplitude and power requirement. The signal amplitude and power requirement can be determined by taking a Fourier transform of a desired correlation function Cd(Tret), which shows the amplitude of each frequency component. The exposure time for each frequency component in the transmitted signal is made proportional to the amplitude given by the Fourier transform. Graph 320 illustrates an example time for exposure for each frequency in the set of frequencies shown in graph 310 according to the desired signal amplitude.

FIG. 3B shows the transmission frequency spectrum of a signal with a single modulation frequency f0 and the corresponding time domain response of the correlation C(Tret) of the reflected signal and the reference signal. Graph 330 shows the transmission frequency of the signal. When only a single modulation frequency f0 is used, the absolute value of the signal amplitude of the correlation C(Tret) is a constant value over all possible return times Tret for the reflections of the transmitted modulated light signal, as shown in graph 340. The argument of the correlation C(Tret) represents the phase of C(Tret), which wraps around every $2\pi$, as shown in graph 350.

FIG. 3C shows the transmission frequency spectrum of a signal with multiple discrete frequencies centered around a frequency f0 and the corresponding time domain response of the correlation C(Tret) of the reflected signal and the reference signal. Graph 360 shows the transmission frequency of the signal with multiple frequencies centered around a frequency f0. FIG. 3A describes one way a signal with multiple frequencies can be generated by a ToF camera. When the frequency spectrum of the transmitted signal is described by graph 360, the absolute value of the signal amplitude of the correlation C(Tret) is a rectangular wave centered around −6/f0, as shown in graph 370, rather than a constant value as shown in graph 340 for a single frequency in the transmitted signal. The argument of the correlation C(Tret) represents the phase of C(Tret), which wraps around every $2\pi$, as shown in graph 380. The phase response is the same whether the transmitted signal includes a single frequency or multiple frequencies. While using multiple frequencies can reduce the impact of long distance reflections, phase ambiguity remains.

FIG. 4 illustrates a set of graphs showing different time domain responses of a correlation of received reflections of light emitted by a time of flight camera and a reference signal. When multiple frequencies are used in the transmitted signal, as shown in FIGS. 3A and 3C, the absolute value of the signal amplitude of the correlation C(Tret) of the received reflections of the transmitted light with a reference signal can be shaped to achieve different responses. For example, as shown in graph 410, the rectangular wave of the absolute value of the correlation C(Tret) can be translated over a time period $\Delta T$ by modifying the transmitted signal, such that it incorporates phase shifts compared to the reference signal. The reference signal will no longer mirror the transmitted signal; instead, the transmitted signal includes similar frequency components as the reference signal, but each frequency component will include a phase shift from the phase in the reference signal. To implement a translation of $\Delta T$ in the absolute value of the correlation C(Tret), the phase of each frequency component fn in the transmitted signal is rotated by $2\pi fn\Delta T$ compared to the reference signal.

As another example, as shown in graph 420, the time shifted rectangular wave shown in graph 410 can be shaped into a triangle wave by changing the spectral content of the modified transmitted signal with phase shifts compared to the reference signal amplitude. Customizing the correlation C(Tret) allows a ToF system to choose a distance of detection according to the needs of the implementation. For example, larger translations of the correlation C(Tret) allow it to capture larger Tret times, which correspond to longer and longer distances away from the ToF camera. Changing the shape of the correlation C(Tret) enables compensation for noise over longer distances and improves the signal to noise ratio.

Figure 5:
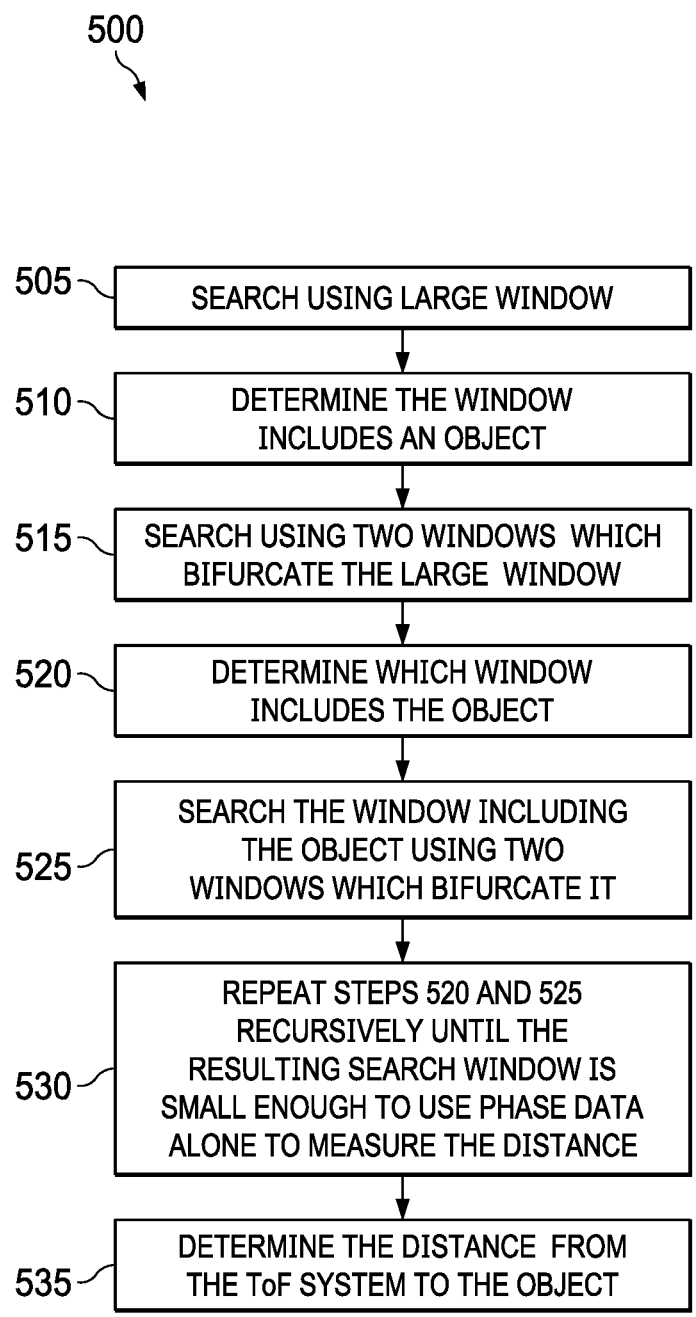
FIG. 5 illustrates an example process of searching a long range of distances using a time of flight camera.

Customizing the transmitted signal, and by extension the correlation C(Tret), allows a ToF system to perform a search operation over a long range of distances to determine the location of an object. FIG. 5 illustrates an example process 500 of binary searching over a large range of distances using customized transmitted signals and correlations C(Tret). The absolute value of the correlation C(Tret) serves as a search window which can be moved over time and shaped to improve signal to noise ratio at longer distances. At 505, the entire range of distances is searched using a single very large search window. At 510, a search module such as controller 170 described in FIG. 1 determines whether the range of distances searched by the search window includes an object. If it does, the search process continues at 515, where the entire range of distances searched by a single window in step 505 is searched again using two search windows which bifurcate the large search window in step 505.

At 520, the search module determines which search window searched the range of distances including the object. At step 525, the range of distances searched by the search window including the object is searched again using two search windows which bifurcate it. Step 530 repeats steps 520 and 525 recursively until the search window size and the range of distances searched by it are small enough to use phase data alone to measure the distance, i.e, the range of distances searched by a window is smaller than a wavelength of a frequency component of the transmitted light. At step 535, the search module determines the distance from the ToF system to the object using the phase data and the final small range of distances found in step 530.

Figure 6:
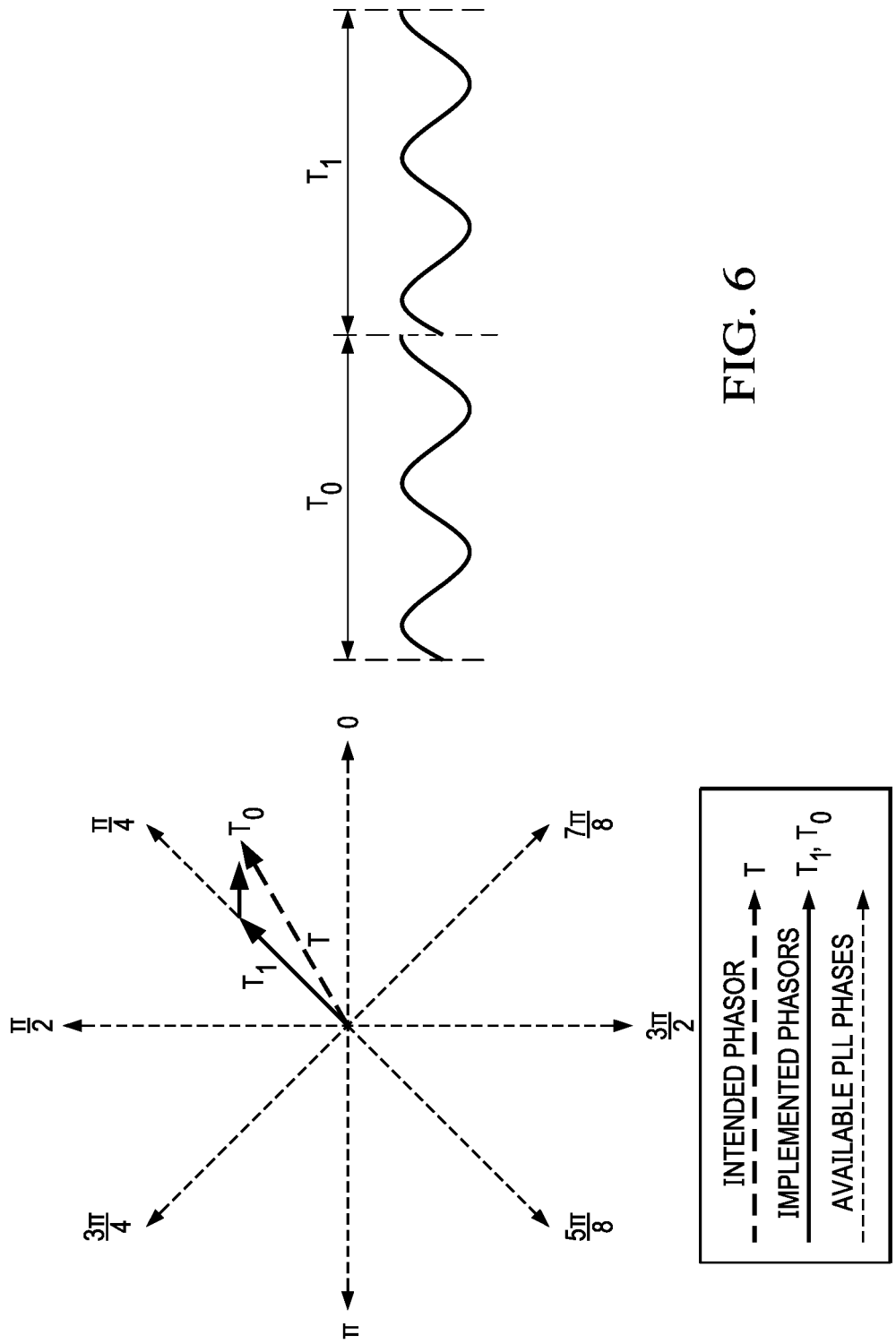
FIG. 6 illustrates an example set of phasors representing a phase shift in an example transmitted signal.

FIG. 6 illustrates an example set of phasors representing a complex frequency component in an example transmitted signal. As described in FIG. 4, time delays in the correlation C(Tret) can be implemented using phase shifts in the transmitted signal frequencies compared to the reference signal frequencies. Each frequency component in the transmitted signal includes a phase shift from the phase of the corresponding frequency component in the reference signal. To implement a translation of $\Delta T$, the phase of each frequency component fn of the transmitted signal is rotated by $2\pi fn\Delta T$. However, this method of implementing translations prompts very fine and precise phase differences between the transmitted signal and the reference signal, which quickly becomes unfeasible for large enough numbers of frequency components in the signals and large enough numbers of translations $\Delta T$.

To simplify implementation of the myriad of phase shifts, each intended phase shift is divided into component phases that are comparatively easy to implement with a phase locked loop (PLL). In the example shown in FIG. 6, a PLL is able to implement eight phases: zero, $\pi/4$, $\pi/2$, $3\pi/4$, $\pi$, $5\pi/4$, $3\pi/2$, and $7\pi/4$. The intended phase shift, represented by intended phasor T, is divided into two component phasors, T1 and T0, both of which the PLL is able to produce. Just as the frequency components can be given different exposure times, each phasor T1 and T0 can be assigned different exposure times within the exposure time allotted to the particular frequency. In the example shown in FIG. 6:

$$T\cos(\theta) = T0\cos(0) + T1\cos\frac{\pi}{4}$$

$$T\sin(\theta) = T0\sin(0) + T1\sin\frac{\pi}{4}$$

$$T \le T0 + T1$$

Then, the received reflections of the transmitted signal can be correlated with the coarse phase offsets sequentially according to the determined exposure time for the particular phasor.

Figure 7:
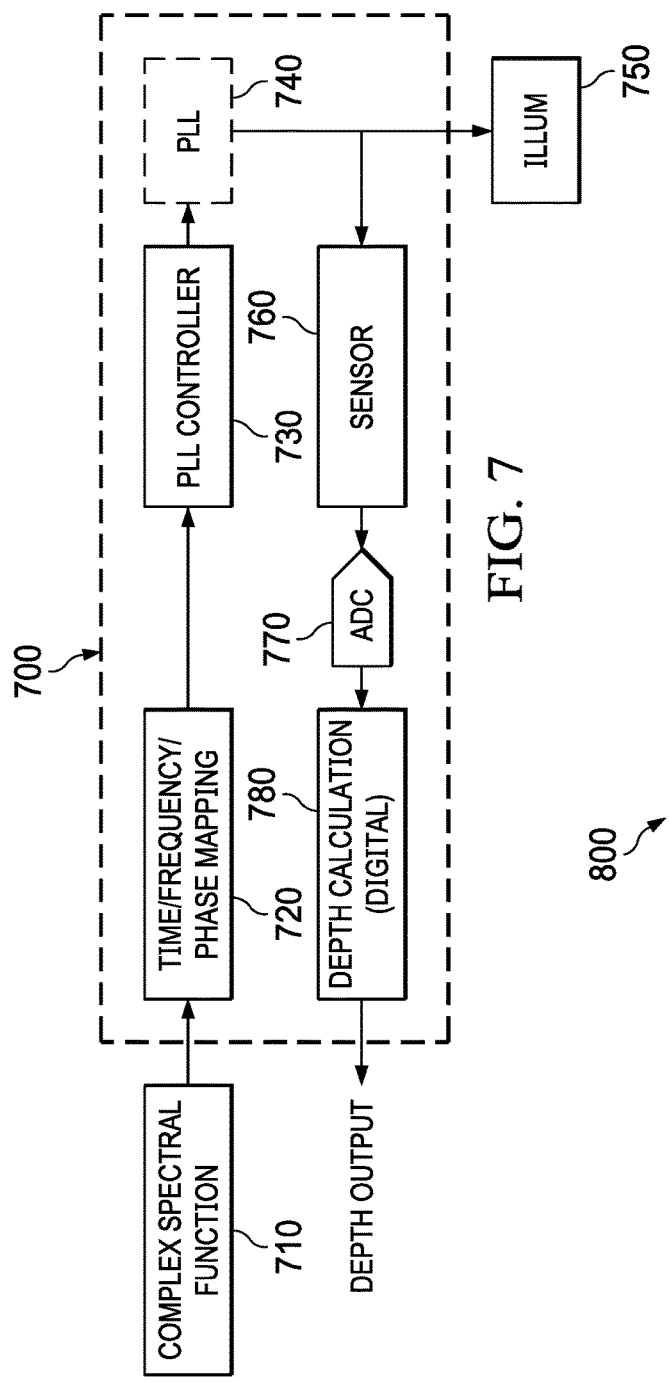
FIG. 7 illustrates a block diagram of an example time of flight camera implementing phase shifts in a transmitted signal.

FIG. 7 illustrates a block diagram of an example time of flight camera 700 implementing phase shifts in a transmitted signal. The complex spectral function 710 to be implemented is received at a time/frequency/phase mapping control block 720, where the complex spectral function 710 is divided into component frequencies, each of which is assigned an exposure time and one or more phases and corresponding sub-exposure times for each phase within the exposure time for the component frequency. Each frequency is sent to a PLL controller 730, which will implement the appropriate phases for the corresponding sub-exposure times determined by the time/frequency/phase mapping control block 720.

In some examples, the PLL controller 730 includes the PLL which will implement the phases. In FIG. 7, the PLL 740 which will implement the phases is separate from PLL controller 730. PLL 740 receives the phase to be implemented for the frequency component and generates a signal at the appropriate frequency and phase indicated by PLL controller 730. The signal at the appropriate frequency and phase is sent to an illumination module 750. Illumination module 750 transmits the signal as continuous wave amplitude modulated light with a myriad of frequencies and phases over the exposure time. Sensor module 760 receives a reference signal from PLL 740 and reflections of the transmitted signal from the scene. The resulting correlation of the reference signal and received reflections is sent to analog to digital converter 770. The resulting sampled correlation is sent to a depth calculation block 780, which calculates the depth map of the scene from the sampled correlation of the reference signal and the received reflections.

Figure 8:
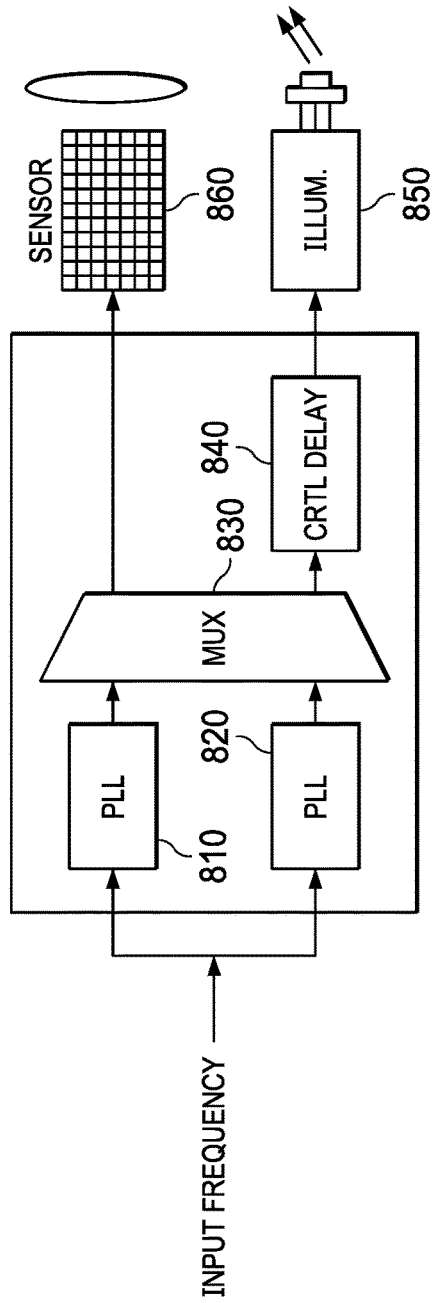
FIG. 8 illustrates a block diagram of an example phase locked loop controller for implementing phase shifts in a transmitted signal.

FIG. 8 illustrates a block diagram of an example phase locked loop controller 800 for implementing phase shifts in a transmitted signal. Component frequencies are input to PLL 810 and PLL 820. Example PLL controller 800 includes two PLLs. Because a PLL takes time to settle to a new frequency every time the input frequency is changed, PLL 810 is used to output the appropriate signal while PLL 820 adjusts to a new frequency. Once PLL 820 adjusts, the MUX 830 switches to output PLL 820 and PLL 810 is provided a new input frequency to adjust to before outputting the appropriate signal. The appropriate signal is sent to a controlled delay 840, which ensures that each component frequency and phase is transmitted for the appropriate length of time by illumination module 850. The reference signal is sent to sensor 860, which receives the reflections of the transmitted signal, and correlates the two signals using smart pixels.

Figure 9:
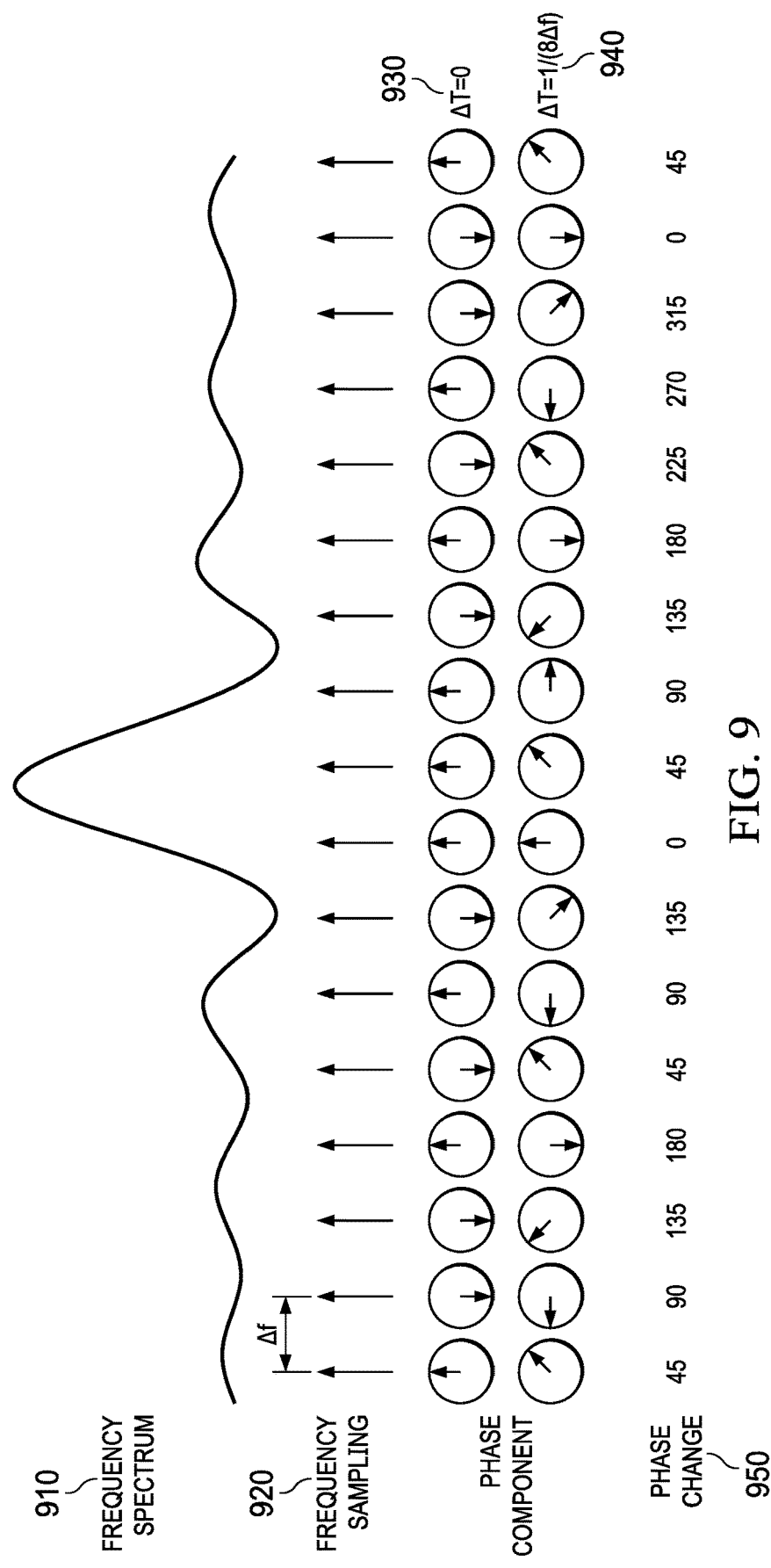
FIG. 9 illustrates a frequency spectrum and phase components of an example transmitted signal.

FIG. 9 illustrates a frequency spectrum and phase components of an example transmitted signal. As FIG. 4 illustrates, the absolute value of the correlation C(Tret) of the received reflections of the transmitted signal and the reference signal can be translated by $\Delta T$ when the phase of each frequency component fn of the transmitted signal is rotated by $2\pi fn \Delta T$ compared to the reference signal. FIG. 9 shows an example frequency spectrum 910 and frequency sampling 920, where each frequency sample is separated by some frequency difference $\Delta f$. Phase component with no time delay $\Delta T$ 930 shows the phase of each frequency component of the transmitted signal as initially sent, the reference signal. Phase component with time delay $\Delta T$ equal to $1/(8\Delta f)$ 940 shows the phase component of each frequency component of the transmitted signal to accomplish a time delay $\Delta T$ of $1/(8\Delta f)$. The phase change 950 shows the phase change for each frequency component between $\Delta T=0$, the reference signal, and $\Delta T=1/(8\Delta f)$, the transmitted signal with a time delay of $1/(8\Delta f)$.

This repeating phase change 950 enables multiple delays within a single transmitted signal using the same set of exposures. The frequency components can be divided into N sets with the same phase change 950—here, there are 8 sets of frequency components. Each set of frequencies is exposed, and the received reflections recorded, separately, resulting in 8 captures per frame. Different linear combinations of transmissions from each set achieves different return times for the received reflections. Each capture is correlated with a unique reference signal. The unique reference signal for each capture is chosen to shift the resulting absolute value of the correlation C(Tret), the search window, over time compared to other C(Tret). The search window can be shifted by 1/N times the unambiguous range of the ToF system, effecting a linear search of the entire range of distances while maintaining the ToF system's signal to noise ratio. Subsequent bin determination of the location of an object is resistant to noise as any noise in the received reflections is isolated to its capture. Shifting the search window for each capture can extend the range of the ToF system.

Figure 10:
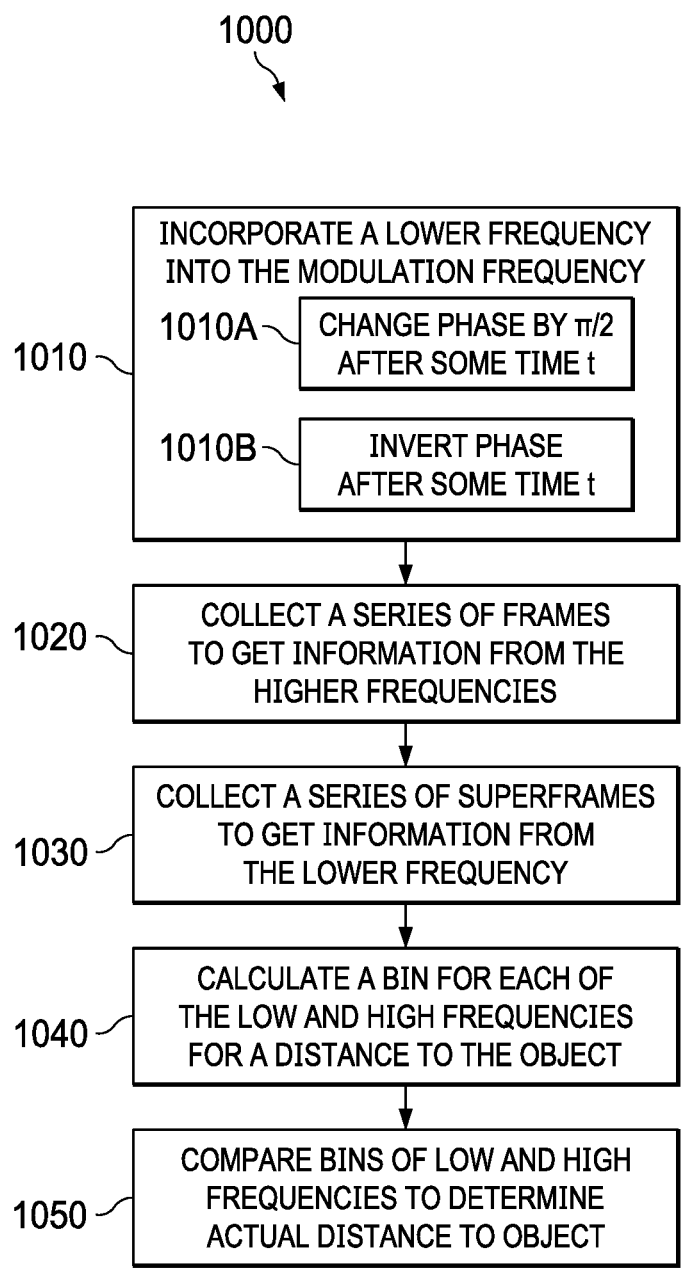
FIG. 10 illustrates another example process for searching a long range of distances using a time of flight system.

FIG. 10 shows another example process 1000 for searching long ranges using a ToF camera. First, at step 1010, a lower frequency is incorporated into the modulation frequency of either the transmitted light signal or the reference signal. The lower frequency can be as low as one tenth the modulation frequency. In some examples, step 1010 is accomplished by step A, changing the phase of the modulation frequency by 90 degrees after some time t. In other examples, step 1010 is accomplished by step B, inverting the phase of the modulation frequency after some time t. This results in a superimposed "metasignal" with a period of 2t and an amplitude that varies like a triangular wave. At step 1020, the ToF camera collects a series of frames to obtain information regarding the scene from the higher modulation frequencies. At step 1030, the ToF collects a series of "metaframes" over longer periods of exposure than the higher modulation frequency frames to obtain information regarding the scene from the lower modulation frequency with the period of 2t. These "metaframes" yield information about the scene at much further distances than the higher modulation frequency frames. At step 1040, a bin for each of the low and high modulation frequencies for a distance to the object is calculated. At step 1050, the bins for the low and high modulation frequencies are compared to determine the actual distance of the object from the ToF system.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A method for performing a search for an object over a range of distances using a time of flight system, comprising:
    generating an amplitude-modulated light signal to be transmitted by an illumination source, wherein the light signal includes a plurality of modulation frequencies;
    wherein each modulation frequency of the plurality of modulation frequencies has a different exposure time than the other modulation frequencies of the plurality of modulation frequencies;

searching a range of distances with an electrical reference signal representing the modulation frequencies of the light signal by:
applying the reference signal to each pixel in an array of pixels,
determining a cross correlation of the reference signal and an incident light signal representing reflections of the transmitted light signal received by each pixel, wherein the cross correlation corresponds to a time period and the range of distances;
calculating, based on the cross correlation, depths of a scene;
determining, based on the depths, that an object is in the range of distances;
generating a modified light signal to be transmitted by the illumination source and searching a modified range of distances with a modified incident light signal representing reflections of the transmitted modified light signal until the modified range of distances is less than a wavelength of a modulation frequency included in the plurality of modulation frequencies,
wherein a cross correlation of the reference signal and the modified incident light signal corresponds to a modified time period and the modified range of distances,
wherein the modified range of distances is included in but smaller than the range of distances, and
wherein generating a modified light signal includes adjusting a phase and an amplitude of one or more frequency components of the light signal; and
determining, in response to the modified range of distances being less than the wavelength of a modulation frequency included in the plurality of modulation frequencies, an object distance.

2. The method of claim 1, wherein the reference signal includes a superimposed signal with a triangle wave shaped amplitude modulation and a period of two times a particular time period.

3. The method of claim 2, wherein the superimposed signal is generated by modifying a phase difference between the modified light signal and the reference signal by 90 degrees after the particular time period.

4. The method of claim 2, wherein the superimposed signal is generated by inverting a phase difference between the modified light signal and the reference signal after the particular time period.

5. The method of claim 1, wherein the phase adjustment of one or more frequency components of the light signal comprises a phase shift compared to a phase of a corresponding frequency component in the reference signal.

6. The method of claim 5, wherein the phase shift comprises a phase shift of $2\pi f_n \Delta T$, wherein $f_n$ represents a frequency of the frequency component and $\Delta T$ represents a time delay between the modified time period and a prior time period.

7. The method of claim 5, wherein the phase shift in the modified light signal is generated by:
determining one or more component phases of the phase shift;
determining a length of time for each of the one or more component phases; and
outputting each component phase for the determined length of time.

8. The method of claim 1, wherein the cross correlation of the reference signal and the incident light signal corresponds to two or more time periods.

9. The method of claim 8, wherein the modified light signal includes one or more sets of frequency components, wherein each set of frequency components include a particular phase change, and wherein generating the modified light signal comprises:
outputting each set of frequency components separately; and
modifying a phase of each set of frequency components, such that the cross correlation of the reference signal and the modified incident light signal corresponds to a number of time periods equal to the number of sets of frequency components.

10. A time of flight system, comprising:
a photosensor having pixels configured to register light reflected by a scene from transmitted modulated light;
a signal generator configured to output at least:
a reference signal corresponding to a modulation function for the modulated light, and
a modified transmitted light signal corresponding to a phase shift of the reference signal; wherein the modified light signal includes a plurality of modulation frequencies; wherein each modulation frequency of the plurality of modulation frequencies has a different exposure time than the other modulation frequencies of the plurality of modulation frequencies; and
a processor configured to:
cause the signal generator to output the modified transmitted light signal,
cause the pixels in the photosensor to register light for an exposure period,
cause the signal generator to output the reference signal to the pixels in the photosensor, and
determine a depth map for the scene based on values recorded by the pixels in the photosensor.

11. The time of flight system of claim 10, wherein the reference signal includes a plurality of discrete modulation frequencies separated by a frequency difference.

12. The time of flight system of claim 10, wherein the reference signal includes a superimposed signal with a triangle wave shaped amplitude modulation and a period of two times a particular time period.

13. The time of flight system of claim 12, wherein the superimposed signal is generated by modifying a phase difference between the reference signal and the modified transmitted light signal by 90 degrees after the particular time period.

14. The time of flight system of claim 12, wherein the superimposed signal is generated by inverting a phase difference between the reference signal and the modified transmitted light signal after the particular time period.

15. The time of flight system of claim 10, wherein the modified transmitted light signal includes a superimposed signal with a triangle wave shaped amplitude modulation and a period of two times a particular time period.

16. The time of flight system of claim 15, wherein the superimposed signal is generated by modifying a phase difference between the reference signal and the modified transmitted light signal by 90 degrees after the particular time period.

17. The time of flight system of claim 15, wherein the superimposed signal is generated by inverting a phase difference between the reference signal and the modified transmitted light signal after the particular time period.

18. The time of flight system of claim 10, wherein the phase shift comprises a phase shift of $2\pi f_n \Delta T$, wherein $f_n$ represents a frequency of a frequency component of the reference signal and ΔT represents a time delay between a first time period at which light was registered by the pixels and a second time period at which light was registered by the pixels.

19. The time of flight system of claim 10, further comprising a phase locked loop controller configured to determine one or more component phases of the phase shift and a length of time for each component phase, operatively coupled to the signal generator to indicate the one or more component phases and corresponding lengths of time.

20. A time of flight system, comprising:
a light source configured to transmit amplitude modulated light to illuminate a scene;
a photosensor having pixels configured to register light reflected by the scene;
a signal generator configured to output at least:
a reference signal corresponding to a modulation function for the modulated light, and
a modified transmitted light signal corresponding to a phase shift of the reference signal wherein the modified light signal includes a plurality of modulation frequencies; wherein each modulation frequency of the plurality of modulation frequencies has a different exposure time than the other modulation frequencies of the plurality of modulation frequencies; and
a processor configured to:
cause the signal generator to output the modified transmitted light signal,
cause the light source to transmit the modified transmitted light signal,
cause the pixels in the photosensor to register light for an exposure period,
cause the signal generator to output the reference signal to the pixels in the photosensor, and
determine a depth map for the scene based on values recorded by the pixels in the photosensor.

21. The time of flight system of claim 20, wherein the reference signal varies a modulation frequency of the modulation function in a sweep of modulation frequency that includes a plurality of modulation frequencies.

22. The time of flight system of claim 20, wherein causing the signal generator to output the reference signal to the pixels results in a cross correlation of the reference signal and light registered by the pixels, the cross correlation corresponding to a time period at which light was registered by the pixels and a range of distances in the scene.

23. The time of flight system of claim 20, wherein the signal generator comprises a phase locked loop controller configured to output a set of component phases.

24. The time of flight system of claim 23, wherein the processor is further configured to:
determine one or more component phases of the phase shift from the set of component phases and a corresponding length of time for each of the one or more component phases; and
cause the phase locked loop controller to output each of the one or more component phases of the phase shift for the corresponding length of time.

* * * * *